March 26, 1963     W. S. STERLING     3,082,514
CLOSURE FEEDING AND ASSEMBLING APPARATUS
Filed Sept. 14, 1959     4 Sheets-Sheet 1

INVENTOR.
BY Walter S. Sterling
Robert R. Churchill
ATTORNEY

March 26, 1963 W. S. STERLING 3,082,514
CLOSURE FEEDING AND ASSEMBLING APPARATUS
Filed Sept. 14, 1959 4 Sheets-Sheet 2

INVENTOR.
Walter S. Sterling
BY
Robert R. Churchill
ATTORNEY

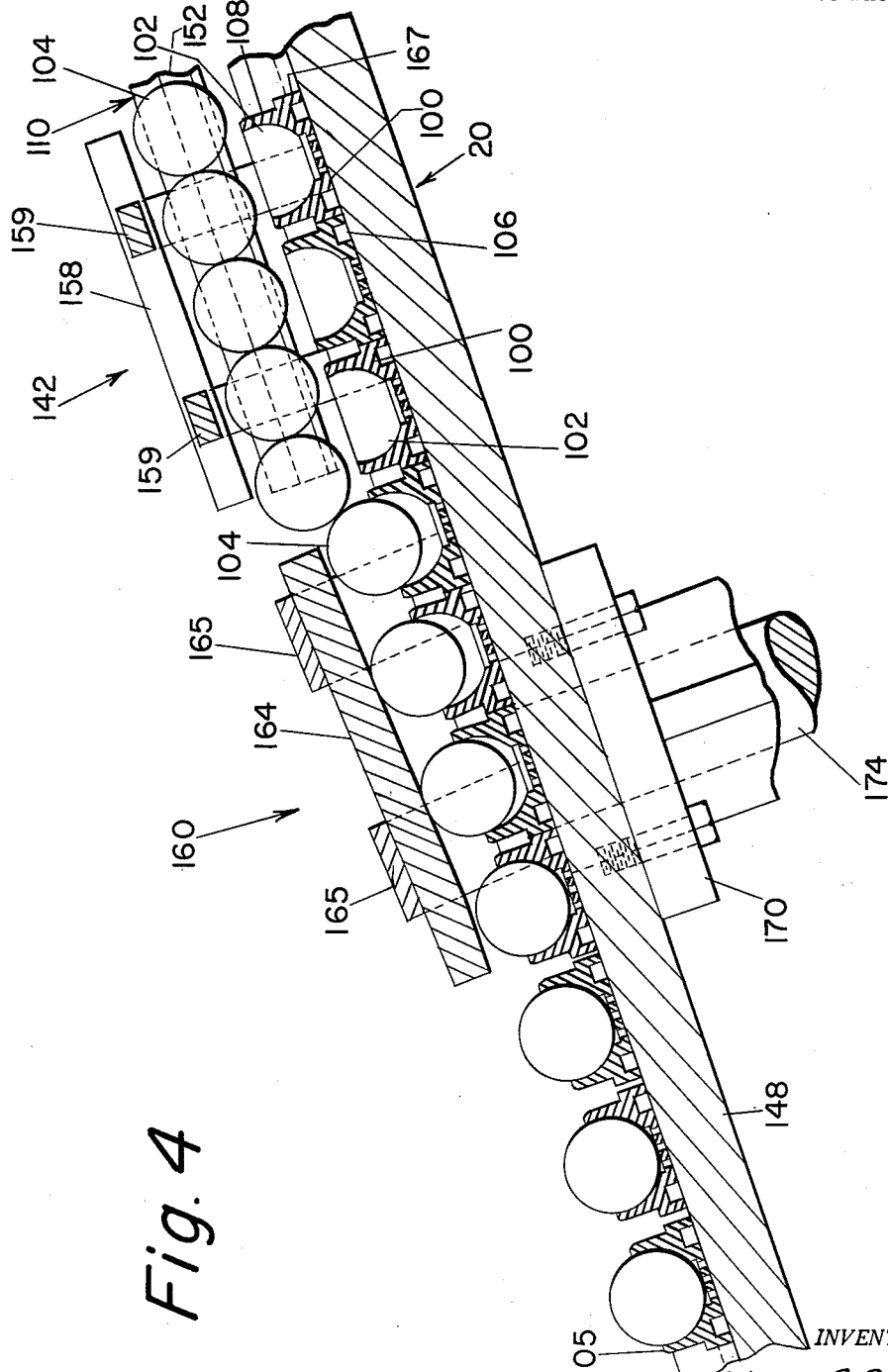

March 26, 1963  W. S. STERLING  3,082,514
CLOSURE FEEDING AND ASSEMBLING APPARATUS
Filed Sept. 14, 1959  4 Sheets-Sheet 4

INVENTOR.
Walter S. Sterling
BY
Robert R. Churchill
ATTORNEY

United States Patent Office 3,082,514
Patented Mar. 26, 1963

3,082,514
CLOSURE FEEDING AND ASSEMBLING
APPARATUS
Walter S. Sterling, Quincy, Mass., assignor to Pneumatic
Scale Corporation, Limited, Quincy, Mass., a corporation of Massachusetts
Filed Sept. 14, 1959, Ser. No. 839,733
8 Claims. (Cl. 29—211)

This invention relates to closure feeding and assembling apparatus.

The invention has for an object to provide novel and improved closure feeding and assembling apparatus particularly adapted for handling two-part closures wherein provision is made for initially feeding the separate closure elements in different paths and for then bringing the closure elements together and assembling the same during the continuous movement of the closure elements in a simple, efficient and rapid manner.

With this general object in view and such others as may hereinafter appear, the invention consists in the closure feeding and assembling apparatus hereinafter described and particularly defined in the claims at the end of the specification.

In the drawings illustrating the preferred embodiment of the invention:

Figure 1:
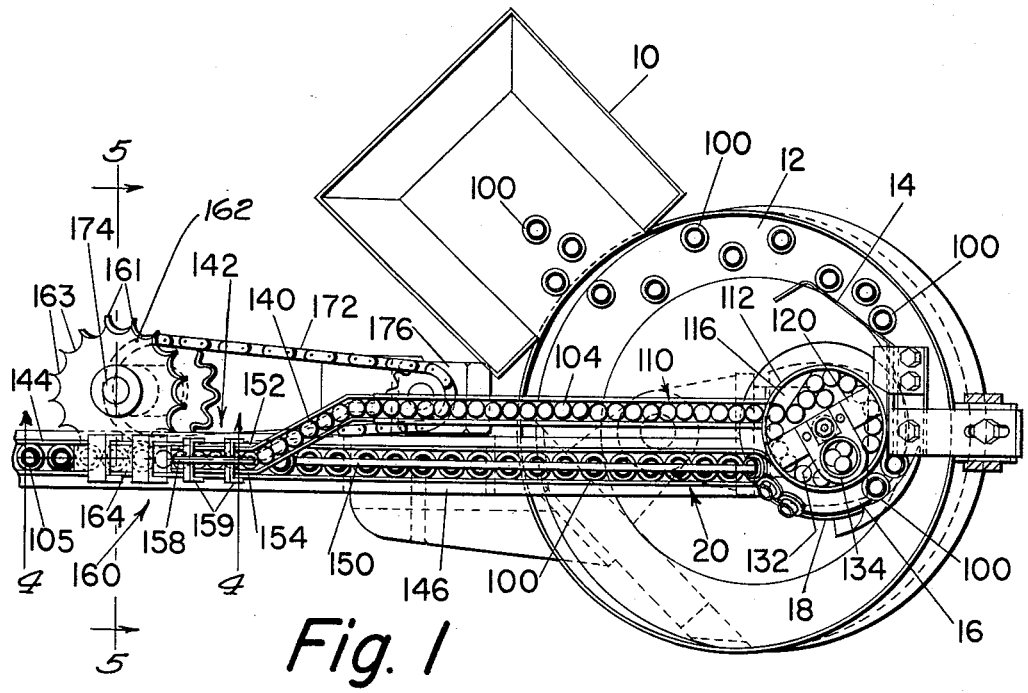
FIG. 1 is a plan view of a closure handling machine embodying the present invention.
Figure 3:
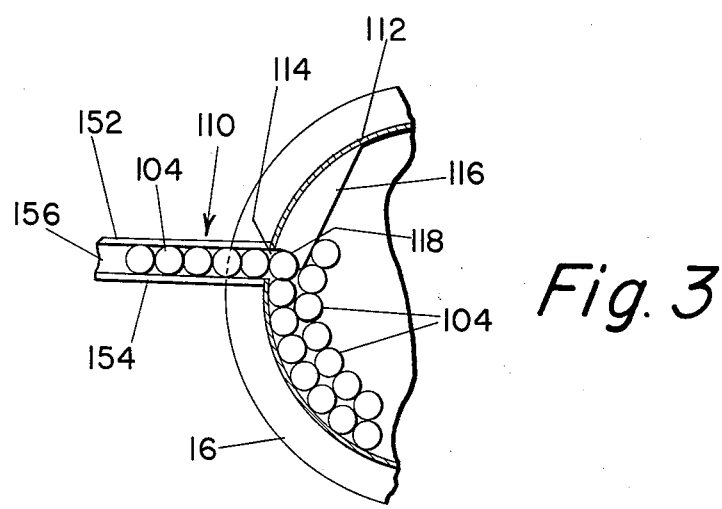
FIG. 3 is a plan view detail, partly in cross section, of a portion of the feeding mechanism for advancing one of the parts of a two-part closure element.
Figure 5:
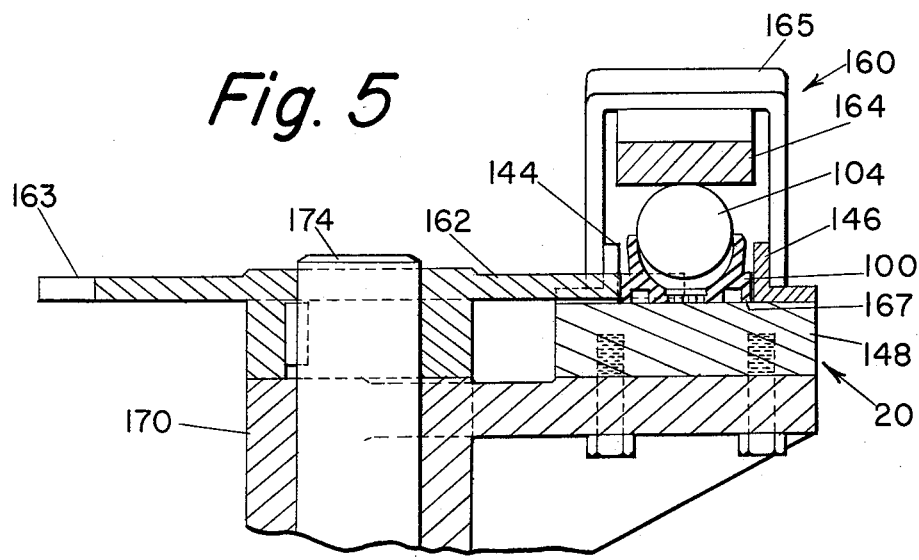
Figure 6:
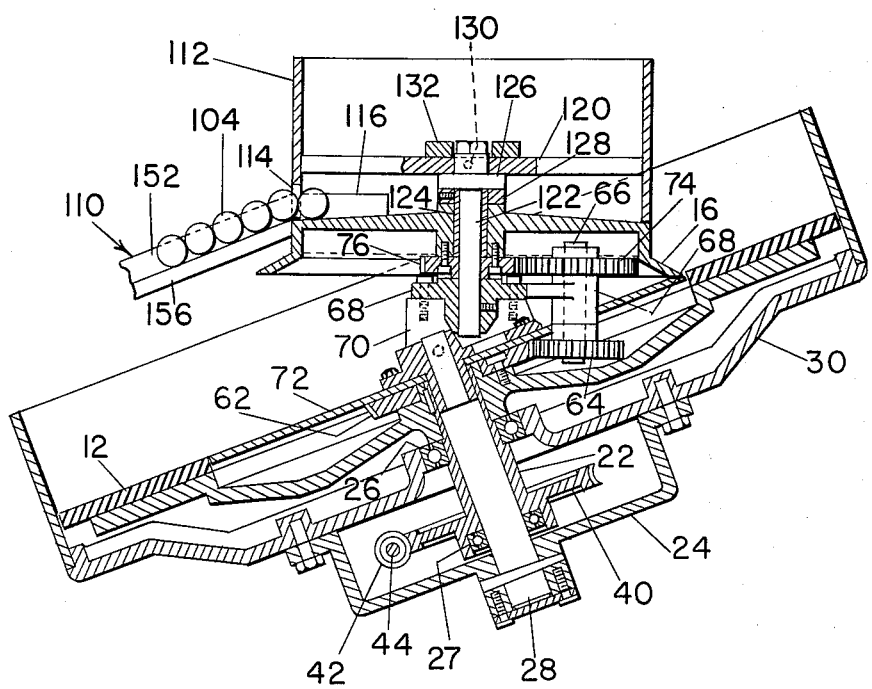

FIGS. 4 and 5 are detail views in vertical cross section taken on the lines 4—4 and 5—5, respectively, of FIG. 1; and FIG. 6 is a vertical section of the orienting apparatus illustrating the driving mechanism.

In general the present invention contemplates novel closure feeding and assembling apparatus for use in connection with a closure applying machine wherein it is desired to deliver the closures in a line and oriented to face in the same direction. In general in the operation of the prior closure feeding apparatus the closures are withdrawn from a bulk supply thereof and guided through orienting mechanism, and the oriented closures are advanced and delivered into the upper end of a feed chute for delivery to the closure applying machine. The closures are successively withdrawn from the lower end of the chute by transfer means forming a part of the closure applying machine to be transferred into operative relation to closure applying mechanism. In the operation of such feeding apparatus the closures in the bulk supply are continuously jostled and changed in position by contact with adjacent closures as they are advanced to cause them to assume a predetermined position to be guided into the orienting mechanism. Those closures which enter the orienting mechanism in other than a predetermined position are rejected to fall back into the bulk supply.

In accordance with the present invention provision is made for adapting the closure handling machine to handle and feed the different parts of a two-part closure into separate feed chutes and for then bringing the parts together and assembling the same during the continuous advance of the parts. More specifically, the present apparatus is particularly adapted to feed and assemble the separate parts of a so-called "roll-on" applicator closure which is applied to a container and is used for applying deodorants and the like to the body. Such closures comprise a plastic assembly having a base portion provided with a socket and a spherical applicator ball inserted into the socket. In the illustrated embodiment of the invention provision is made for initially feeding the closure base members and the applicator balls in separate paths or chutes through which the parts are advanced by gravity and for thereafter guiding the balls into alignment with successive base members and assembling the same during the continuous movement of the parts whereby to provide a continuous supply of assembled closures to the closure applying machine.

Referring now to the drawings, the present invention is illustrated as embodied in a closure feeding apparatus of the type illustrated and described in my United States Patent No. 2,715,978, issued August 23, 1955, wherein a bulk supply of closures may be stored in a hopper 10 to be delivered to a rotary inclined carrier indicated generally at 12 which is adapted to advance the closures deposited at the lower end thereof from the hopper and to carry the closures upwardly into engagement with guide means indicated generally at 14. Successive closures arriving at the upper end of the inclined carrier are guided into engagement with the beveled marginal edge of a rotary orienting disk 16 arranged in a substantially horizontal plane and preferably in a plane slightly inclined downwardly with respect to the plane of the carrier disk 12. As the closures are advanced along the edge of the orienting disk 16 they leave the carrier 12 and are supported between the beveled edge of the orienting disk 16 and a cooperating stationary closure supporting rail 18. In operation those closures assuming a desired predetermined position between the orienting disk 16 and the rail 18 are capable of maintaining their stability and are advanced into the upper end of a delivery or feed chute 20 for delivery to the closure applying or other machine. Those closures assuming other than the desired position are incapable of maintaining their stability between the disk 16 and rail 18 and are permitted to fall back onto the carrier 12 to be returned to the main group of closures at the lower end of the carrier 12 to be again advanced into engagement with the orienting mechanism.

Figure 2:
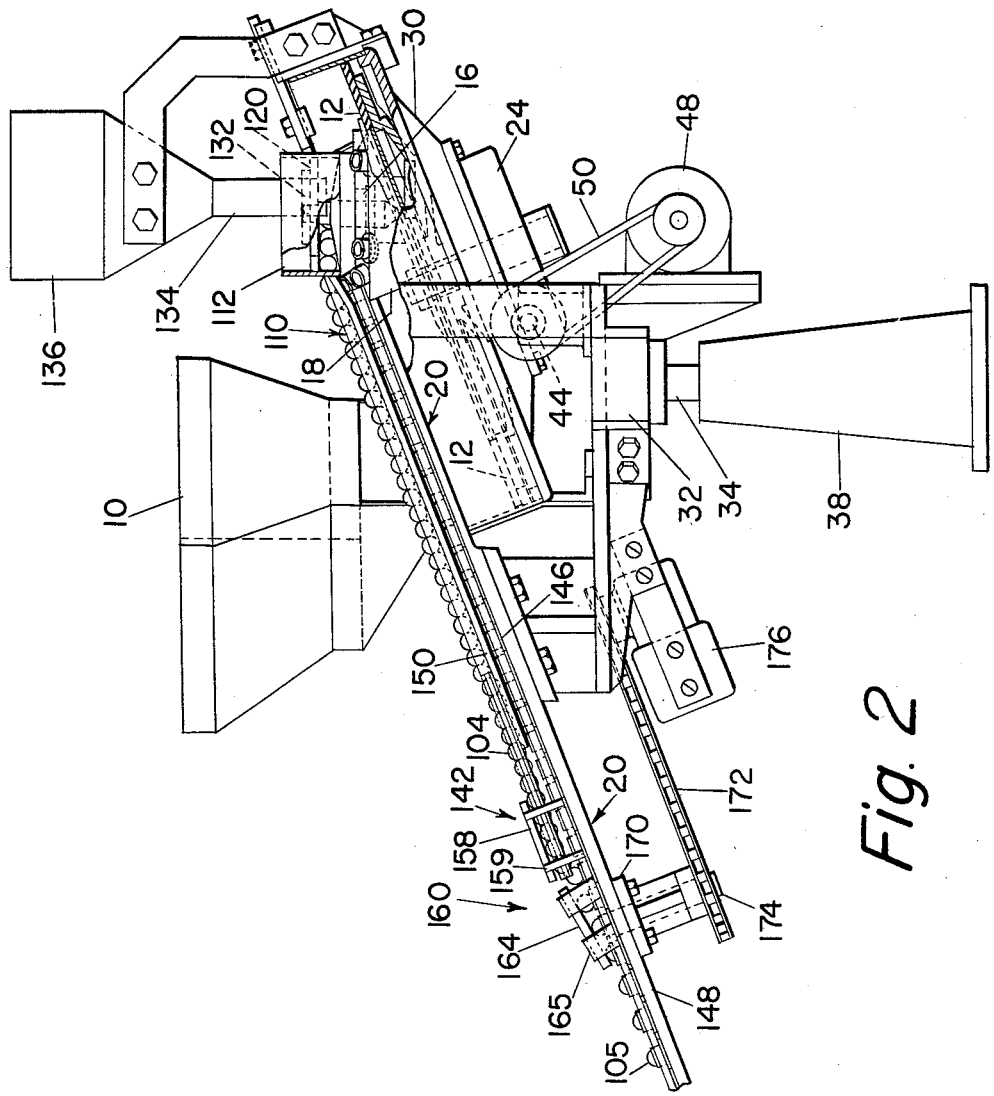
FIG. 2 is a side elevation of the same.

As illustrated in FIGS. 2 and 6, the rotary carrier 12 is keyed to a sleeve shaft 22 supported on a central stationary shaft 23 mounted in a gear box 24 secured to the underside of a circular bracket 30. The bracket 30 is attached to a bracket 32 which is secured to a column 34 adjustably supported in a base member 38. The sleeve shaft 22 is mounted to rotate in a ball bearing 26 supported in the bracket 30 and ball bearing 27 carried by the sleeve shaft, and the latter is provided at its lower end with a worm wheel 40 formed integrally therewith and arranged to mesh with a worm gear 42 fast on a shaft 44 journaled in the gear box 24. The shaft 44 is arranged to be rotated by an electric motor 48 connected to the shaft 44 by a belt and pulley drive 50.

The orienting disk 16 is arranged to be rotated through connections from the carrier disk 12 and, as herein shown, a gear 62 secured to the hub of the carrier disk 12 is arranged to mesh with a gear 64 fast on the lower end of a shaft 66. The shaft 66 is journaled in a bracket 68 attached to the upper end of a bracket 70 which is supported on the upper end of the stationary shaft 28. The bracket 70 also supports a central stationary disk 72 arranged within the annular space formed by the rotary carrier disk 12 and aligned with the upper surface thereof. The upper end of the shaft 66 is provided with a gear 74 which meshes with a gear 76 secured to the underside of the orienting disk as shown.

In accordance with the present invention the apparatus above described is adapted to handle and assemble a two-part closure, herein illustrated as comprising a base member 100 having a socket portion 102 at its upper end and an applicator ball 104 adapted to be fitted into the socket portion 102, the assembled closure being indicated at 105. The base member 100 is provided on its underside with a grooved portion 106 adapted to be pressed or otherwise applied onto the neck of a container not shown. The bottom wall of the closure is perforated as shown to provide communication between the contents of the container and the applicator ball. The base member preferably comprises a plastic material of a suitable resiliency so that the ball 104 can be resiliently pressed into and through the smaller diameter expandable upper end or rim 108 of the wall of the socket portion 102, the wall returning to its initial shape when the ball is seated whereby to rotatably retain the ball in its socket.

As herein shown, the closure base members 100 are handled in the apparatus in the usual manner, the members 100 being carried upwardly on the carrier disk 12 and guided by the rail 14 onto the beveled portion of the rotary orienting disk 16 and between the disk and the closure supporting rail 18. Those closures or base members 100 assuming a predetermined position therebetween are carried around with the disk and advanced into the upper end of the inclined feed chute 20 to form a line of oriented base members having the socket portions 102 uppermost.

The applicator balls 104 which may also comprise plastic preferably of a harder or less resilient material, are delivered into a second inclined feed chute indicated generally at 110, which is spaced from and supported above the feed chute 20. As herein illustrated, a supply of the applicator balls 104 is deposited into a stationary upstanding tubular confining ring 112 open at top and bottom and which is supported immediately above the upper surface of the rotary marginally beveled orienting disk 16. The applicator balls rest on the upper surface of the orienting disk 16 and are carried around therewith and are arranged to escape therefrom one at a time through an opening 114 formed at the lower edge of the upstanding tubular confining ring 112 to be delivered into the chute 110. The upper surface of the orienting disk on which the balls rest may be slightly conical, as shown, in order to guide the balls against the inner wall of the confining ring, and a stop member 116 secured to the inner wall of the upstanding confining ring and aligned with the far side of the opening 114 is arranged in the path of the outer ring of balls confined in the upstanding ring 112. The front face of the stop 116 may be provided with a curved or concave guiding surface 118 to guide an individual ball 104 engaged thereagainst into the upper end of the inclined feed chute 110 under the gentle pressure of succeeding balls being carried around in a clockwise direction by the rotary orienting disk 16. The trailing end of the stop may extend angularly, as shown, to guide surplus balls into the outer ring during continuous rotation of the disk. It will be understood that when the chute 110 is filled, the supply of applicator balls confined within the ring will be gently displaced and carried around with the disk with a minimum of friction, and those balls immediately in front of the stop may merely roll around on the disk in engagement with the stop in readiness to be deposited in the chute 110 upon withdrawal of successive balls 104 from the delivery end thereof.

As herein shown, the stationary upstanding ring 112 is provided with a diametrically extended supporting bar 120 connected at its ends to the inner wall of the ring and is supported centrally of the bar on the upper end of a stationary shaft 122 which is secured to and extends vertically from the bracket 68 as shown in FIG. 6. The orienting disk 16 is provided with a bushing 124 and is rotatably supported on the shaft 122 between the upper face of the gear 76 which is secured to the orienting disk 16 and bears against the upper face of the bracket 68, the upper end of the bushing bearing against the underside of an enlarged diameter shouldered portion 126 formed on the shaft. A collar 128 is provided between the upper end of the orienting disk hub and the underside of the shouldered portion 126. The lower end of the shaft 122 is fixed in the bracket 68, and the supporting bar 120 rests on the upper face of the shouldered portion 126 and is secured to the upper end of the shaft by a set screw 130.

As shown in FIGS. 1 and 2, a plate 132 secured to and extended laterally from the supporting bar 120 is arranged to support a funnel 134 open at both ends and through which the balls are delivered by gravity from a supply hopper 136 connected to the upper end of the funnel.

From the description thus far it will be observed that the closure base members 100 are continuously supplied to the inclined chute 20 in a line and in an oriented condition with the socket portions 102 uppermost, and the balls 104 are continuously supplied to the second inclined chute 110 disposed above and spaced from the chute 20, both parts 100, 104 of the two-part closures being advanced along their respective chutes by gravity. The ball receiving end of the chute 110 is spaced laterally from and extends substantially parallel to the chute 20 for a substantial distance and is then provided with an offset portion 140 to extend the delivery end 142 of the chute parallel to and immediately above the chute 20 to permit release of successive balls 104 by gravity into the tops of the socket portions 102 of successive base members 100. The chutes 20 and 110 are of similar construction, the chute 20 having side rails 144, 146, a bottom rail 148 and a top rail 150. The chute 110 is also provided with side rails 152, 154 and a bottom rail 156, the discharge end of the chute 142 being also provided with a top rail 158 as shown. It will be observed that the bottom rail 156 is discontinued at the discharge end 142 and the balls are suspended between the inwardly directed legs of the angle side rails 152, 154.

The closure assembly device indicated generally at 160 is disposed at an intermediate portion of the chute 20 and includes a driven star wheel 162 provided with a plurality of pockets 163 in the periphery thereof arranged to positively control the advance of the closure base members 100 with the balls 104 loosely deposited on top thereof, and a stationary downwardly inclined rail 164 supported from the side rails 144, 146 and arranged in the path of the balls loosely supported on the tops of the base members. As herein shown, the rail 164 is supported on the underside of a pair of inverted U-shaped brackets 165 upstanding from the side rails 144, 146. A portion of the side rail 144 is discontinued adjacent the assembly device to permit the periphery of the star wheel 162 to extend into the path of the base members 100, and the star wheel is arranged to engage successive individual base members 100 being advanced thereto by gravity to control the advance thereof. Immediately prior to arrival of the base members 100 into engagement with the driven star wheel 162, the delivery end 142 of the ball chute 110 is arranged to release and guide successive balls 104 singly into the tops of successive socket portions 102, as illustrated in FIG. 4, the advance of the base members being controlled by the star wheel 162 so as to provide a ball on top of each socket. The star wheel 162 is mounted for rotation in a bracket 170 attached to the chute 20 and is arranged to be rotated by a chain and sprocket drive 172 connected between the star wheel shaft 174 and the output shaft of a gear reduction motor unit 176 supported from the machine frame.

As shown in FIG. 4, the applicator balls 104 are suspended in contiguous engagement in a line in the chute 142 between the angle side rails 152, 154 and are confined to prevent upward displacement by the top rail 158 which may be supported by brackets 159 extended from the bottom rail 148 of the chute 20. In operation the balls 104 ride off the open end of the chute 142 directly into the socket portions 102 of successive contiguous base members 100, a ball resting in one socket serving as a stop for the line in the delivery end of the chute 142, as shown, to drop into a succeeding socket during the continuous movement of the base members 100.

In the operation of the assembly device, as best shown in FIGS. 4 and 5, the base members 100 with the applicator balls loosely supported in the socket portions 102 are individually engaged in successive pockets 163 of the star wheel, the points 161 of the star wheel entering between the lower shouldered portions 167 thereof as shown. While thus engaged, a base member 100 is positively advanced to present its loosely supported ball 104 into engagement with the underside of the inclined rail 164 positioned in the path thereof to press the ball downwardly into the socket. During the pressing operation the resilient wall of the socket is expanded, as indicated, to receive the ball and immediately thereafter the ball will snap into place within the socket to complete the assembly, the socket wall returning to its initial position to retain the ball therein. Sufficient clearance is provided by the socket to permit free rotation of the ball therein. The assembled two-part closures 105 then pass under the lower end of the downwardly inclined rail 164 free of the assembly device to flow by gravity through the lower end of the chute 20 to be withdrawn therefrom under the control of the closure applying machine. In practice the supply of assembled closures 105 is preferably coordinated with the demand therefor, suitable provision, not shown, being made for stopping the closure supply when the same exceeds the demand.

From the above description it will be seen that the present invention provides closure feeding and assembling apparatus particularly adapted for handling two-part closures and assembling the same during the continuous movement of the closure elements in a simple and efficient manner.

While the preferred embodiment of the invention has been herein illustrated and described, it will be understood that the invention may be embodied in other forms within the scope of the following claims.

Having thus described the invention, what is claimed is:

1. In a closure handling machine of the character described, in combination, means for guiding the separate elements of a two-part closure fed by gravity in different substantially parallel paths and in contiguous engagement, means for positively engaging and continuously advancing the elements in one of said paths while maintained in said contiguous engagement, means for directing successive elements in the second path to fall by gravity into operative position to be assembled with successive contiguous elements in said first path, and fixed means disposed in the path of the operatively positioned elements and inclined toward said first path for moving the elements into assembled relation during the continuous advance of the elements.

2. In a closure handling machine of the character described, in combination, means for feeding and guiding the separate elements of a two-part closure by gravity in separate substantially parallel paths, and in contiguous engagement, means for engaging and continuously advancing successive elements in one of said paths while maintained in contiguous engagement, means for directing successive elements in the second path to fall by gravity and rest on top of successive elements in said first path in loosely combined relation, and stationary means disposed in the path of the loosely combined elements and inclined toward said first path for pressing the elements together into assembled relation during the continuous advance thereof.

3. A closure handling machine as defined in claim 2 wherein the advancing means includes a continuously driven star wheel arranged to positively control the advance of successive contiguous elements in said first path.

4. A closure handling machine as defined in claim 2 wherein the stationary pressing means includes an inclined fixed rail arranged to engage the top of the loosely combined elements and to progressively press the elements into assembled relation during the advance of the elements.

5. In a closure handling machine of the character described, in combination, an inclined feed chute, means for orienting one element of a two-part closure and depositing the oriented elements into said feed chute in contiguous engagement, a second inclined feed chute having its delivery end arranged immediately above and parallel to said first inclined feed chute, means for feeding and depositing the second elements of the two-part closure into said second chute in contiguous engagement, means for positively engaging and continuously advancing the elements in said first chute while maintained in said contiguous engagement, means for directing successive elements in the second chute to fall by gravity and rest on top of successive contiguous elements in said first chute in loosely combined relation, and a stationary downwardly inclined fix rail disposed in the path of the loosely combined elements and inclined downwardly towards the second lower chute for pressing the elements together into assembled relation during the continuous advance thereof.

6. In a closure handling machine of the character described, in combination, an inclined feed chute, means including a rotary orienting disk for orienting one element of a two-part closure and depositing the oriented elements into said feed chute to be advanced by gravity and in contiguous engagement, a second inclined feed chute, means for feeding and depositing successive second elements of the two-part closure into said second chute to be advanced by gravity and in contiguous engagement, said last-named means comprising means supported above said orienting disk for confining a supply of said second elements on top of the rotary disk to be carried around therewith, said confining means having an opening therein and a stop member adjacent said opening for guiding the rotated elements singly into said second chute, means for engaging and positively advancing the elements in said first chute while maintained in said contiguous engagement, means for directing successive contiguous elements in the second chute to fall by gravity and rest on top of successive contiguous elements in said first chute in loosely combined relation, and stationary means disposed in the path of the loosely combined elements for pressing the elements together into assembled relation during the continuous advance thereof.

7. A closure handling machine as defined in claim 6 wherein the top of said orienting disk is slightly conically shaped to urge the confined elements downwardly and outwardly against the inner wall of said confining means and into the path of said stop.

8. In a closure handling machine of the character described, in combination, means adapted to handle a two-part closure of the ball and socket applicator type comprising an inclined feed chute, means for orienting the socket elements and depositing the same into said feed chute in contiguous engagement and with the socket portion uppermost, a second inclined feed chute having its delivery end arranged immediately above and parallel to said first inclined feed chute, means for feeding and depositing the applicator balls into said second chute in contiguous engagement, a driven star wheel arranged to engage and positively advance the socket elements in said first chute while maintained in said contiguous engagement, means at said delivery end for directing successive contiguously arranged applicator balls to fall by gravity and rest loosely on top of successive socket elements, and a fixed inclined rail disposed in the path of said loosely combined elements for pressing the balls down into assembled relation with said sockets during the continuous advance thereof.

References Cited in the file of this patent

UNITED STATES PATENTS

| | | |
|---|---|---|
| 1,990,148 | Tevander | Feb. 5, 1935 |
| 2,613,861 | Goerlitz | Oct. 14, 1952 |
| 2,728,091 | Hoenk | Dec. 27, 1955 |
| 2,729,833 | Nielsen | Jan. 10, 1956 |
| 2,752,618 | Stern | July 3, 1956 |